UNITED STATES PATENT OFFICE.

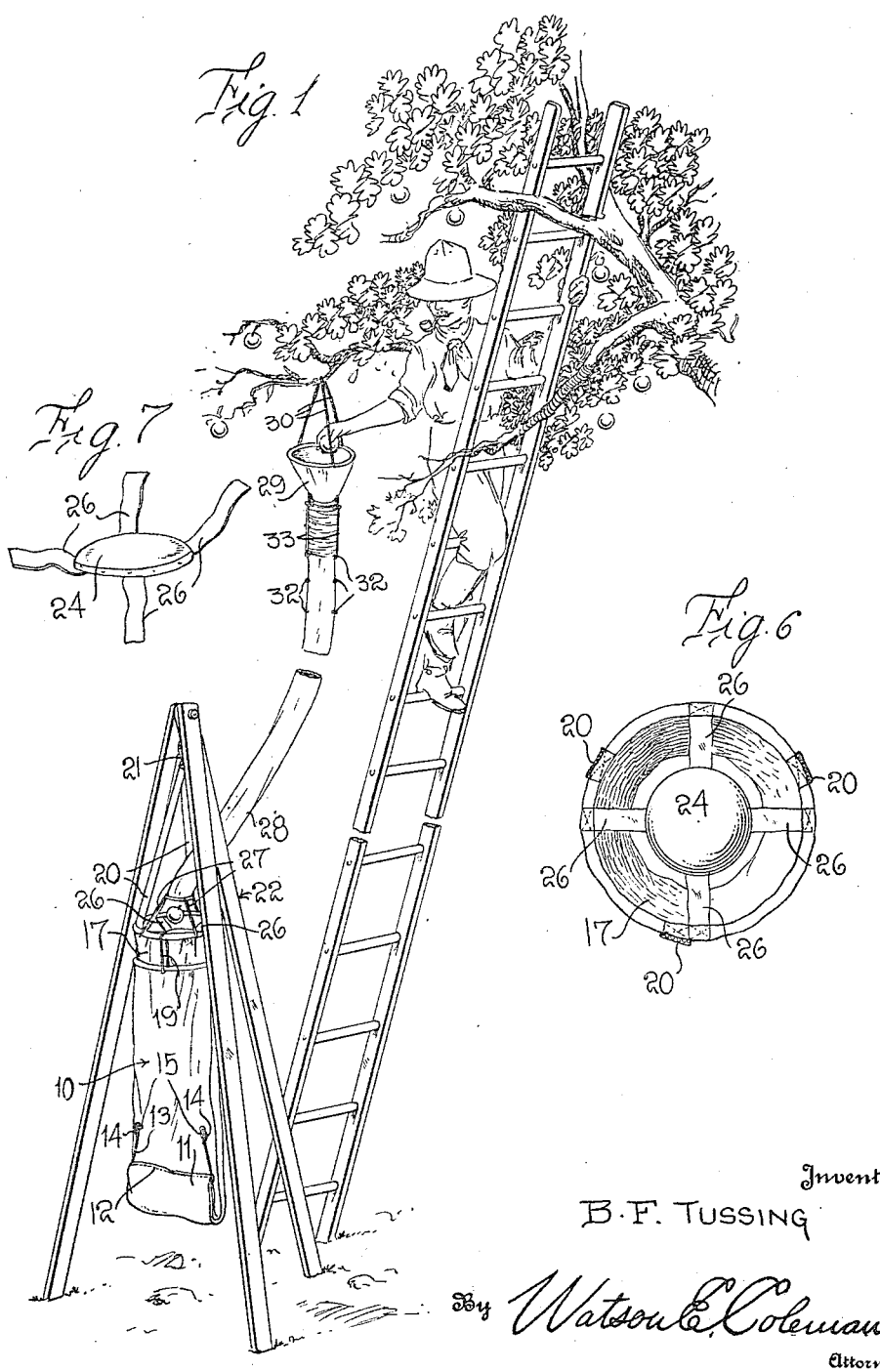

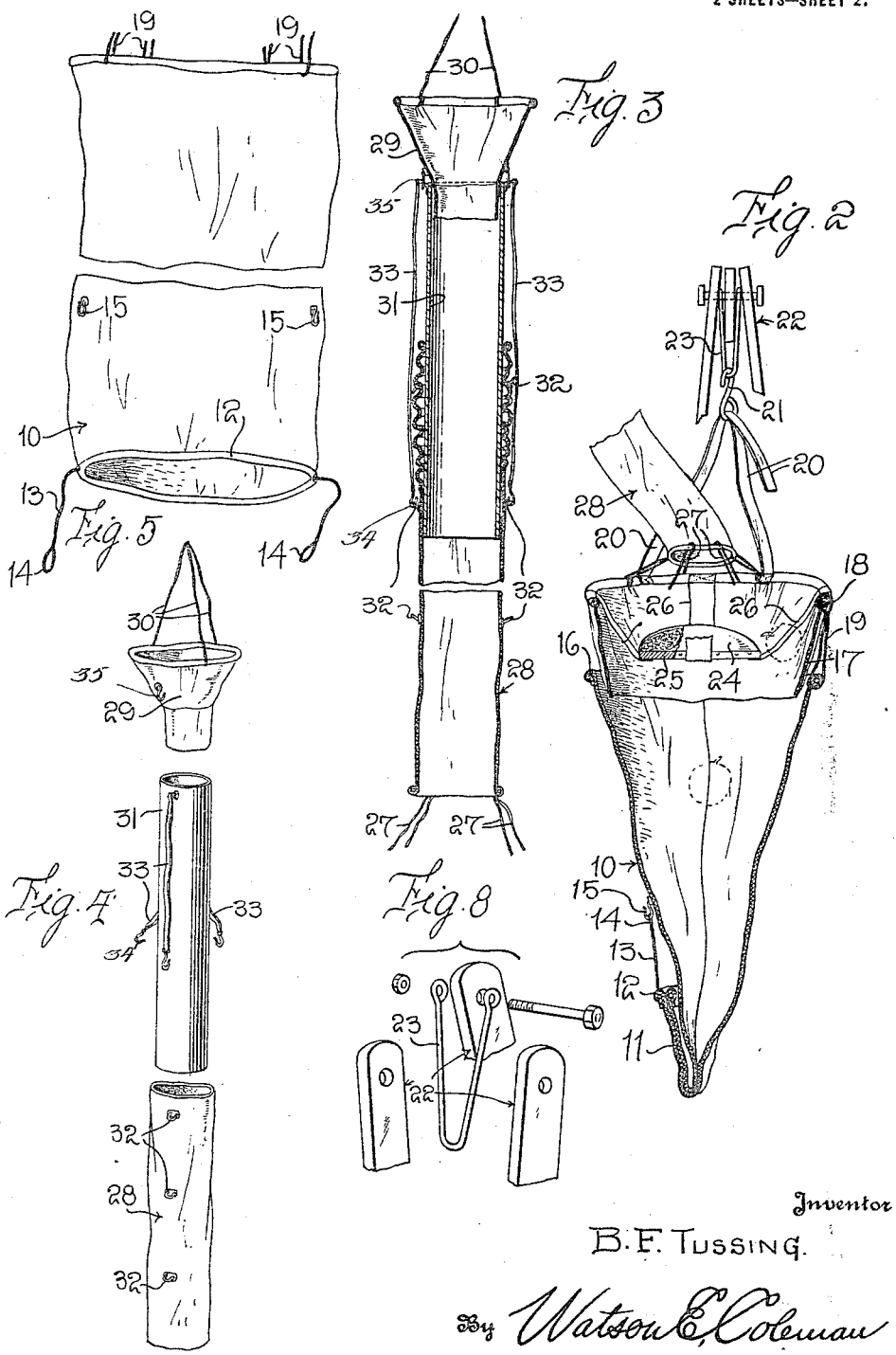

BENJAMIN FRANKLIN TUSSING, OF FRUITLAND, IDAHO.

FRUIT-GATHERING DEVICE.

1,276,453.     Specification of Letters Patent.     Patented Aug. 20, 1918.

Application filed February 5, 1918. Serial No. 215,527.

*To all whom it may concern:*

Be it known that I, BENJAMIN F. TUSSING, a citizen of the United States, residing at Fruitland, in the county of Payette and State of Idaho, have invented certain new and useful Improvements in Fruit-Gathering Devices, of which the following is a specification, reference being had to the accompanying drawings.

This invention relates to devices for gathering fruit and particularly to means for guiding the picked fruit into a sack or receptacle from which the fruit is discharged into baskets or other containers.

The general object of the invention is to provide what may be termed a chute of cloth or other suitable material leading to the receiving receptacle, to provide means for supporting the receiving receptacle, to provide means whereby the chute may be supported with its open receiving end adjacent to the picker, and to provide means whereby the chute may be lengthened or shortened.

A further object is to provide a cushion supported just above the open end of the sack or receptacle against which the fruit drops, this cushion preventing the bruising of the fruit.

A further object resides in certain details of construction and arrangement of parts which will be hereinafter described.

My invention is illustrated in the accompanying drawings, wherein:—

Figure 1 is a perspective view of a fruit gathering device constructed in accordance with my invention and showing the device in use;

Fig. 2 is a vertical sectional view through the fruit gathering sack and showing in elevation a portion of the chute and a portion of the supporting tripod;

Fig. 3 is a vertical sectional view through the upper portion of the chute;

Fig. 4 is a perspective view of the upper portion of the chute with the various elements thereof detached;

Fig. 5 is a perspective view of the receiving sack;

Fig. 6 is a top plan view of the hopper 17 and the cushioning pad therein, the supporting tapes 20 being in section;

Fig. 7 is a perspective view of the cushioning pad; and

Fig. 8 is a fragmentary perspective view of the upper portion of the tripod, with the various parts thereof shown as detached.

Referring to the drawings, 10 designates a receiving sack which is made of canvas and has any desired capacity, this sack being open at its top and open at its bottom, but the lower end of the sack being adapted to be folded up, that is, folded over upon the body of the sack in the manner illustrated in Fig. 2, so as to normally close the discharge end of the sack. This folded over portion 11 may be supported in its folded position in any suitable manner, but I have illustrated for this purpose the lower end of the sack as being formed with a hem 12 through which a rope 13 passes, this rope having eyes or loops 14 formed at its ends. Hooks 15 are attached to the side walls of the sack 10 with which these loops engage. When the loops 14 are disengaged from the hooks, the lower portion of the sack will drop down discharging the contents of the sack. The material at the upper end of the sack is folded over upon an annular core 16, and disposed in the upper end of the sack and extending down thereinto is a hopper 17 which is made of canvas, the upper end of which is turned over around the core 18 and the upper end of the hopper 17 is connected to the upper end of the sack 10 by means of cords or other connecting members 19, in the manner illustrated in Fig. 1, so that the lower end of the hopper is supported within the sack and cannot move out of the sack.

Attached to the upper end of the hopper are the tapes or straps 20, which are provided at their upper ends with a hook 21. A folding tripod, the legs of which are designated 22, is provided at its upper end with a hook 23, with which the hook 21 is engaged. The upper ends of the tripod legs are pivoted to each other so that the tripod legs may be moved into or out of parallel relation. The tripod is of sufficient height to support the sack with its lower end slightly above the ground.

Disposed within the hopper 17 is a cushion 24 comprising a disk 25 with a cushioning pad attached to its upper face, this disk being supported by cords 26 which extend upward and extend around the upper end of the hopper and particularly around the core 18. This cushion is spaced a sufficient distance from the walls of the hopper so that fruit striking the cushion may roll off and drop downward through the hopper and into the sack or receptacle 10.

Connected to the hopper by cords or other flexible connections 27 is a flexible tube 28 of canvas or other suitable material, the cords 27 being so arranged that the lower end of this tube will be at all times held over the upper end of the hopper no matter in what direction the chute 28 extends. Disposed in the upper end of the chute is a receiving hopper 29, which is also preferably made of canvas or like material and has its small end inserted into the extremity of the tube or chute 28. This receiving hopper or funnel 29 is provided with loops 30 whereby it may be supported on a limb or by the hand of the fruit picker or in any other suitable manner. Preferably a relatively stiff tube, as for instance a tube made of tin, is disposed in the upper end of the chute or tube 28, this tin tube being designated 31, the upper end of the metallic tube 31 being attached to the hopper 29 as by small hooks 35. The tube 28 is provided at two-foot intervals with rings 32 and to the metallic tube 31 is attached oppositely disposed flexible cords or tapes 33 having hooks 34 at their lower ends, which may be engaged with any of the rings 32. When the picker is picking the fruit from the lower limbs of the tree, the hooks 34 are engaged with the lowermost set of rings 32 and then as the picker moves up into the tree, he disengages the snap hooks from the lowermost set of rings and engages them with the next higher rings, gradually lengthening the tube as he climbs. This will be evident from Fig. 3.

The practical use of my invention will be understood from what has gone before. As the picker climbs up into the tree, the tube 28 is lengthened and as the fruit is picked, it is dropped into the receiving hopper 29, passes down through the tube 31 and is discharged upon the cushion 24 and from this cushion is discharged into the receptacle. When this receptacle is filled, the bottom of the receptacle is opened and the fruit poured out. It will be understood that the tube 28 has preferably a diameter equal to the diameter of the fruit being picked, so that the fruit will not fall down too rapidly through this tube but will roll down through the tube. The receptacle may be of any suitable size and the cushion prevents the fruit from being discharged from the tube 28 and dropping violently into the receptacle, thus causing the fruit to be bruised. I have found this device extremely convenient in fruit picking, as it enables the picker to work steadily without the necessity of climbing down from the ladder or from the tree in order to empty his fruit bag and then climbing back again. The chute may be angularly flexed so as to pass over limbs without interfering with the downward passage of the fruit to any marked extent.

Having described my invention, what I claim is:—

1. A fruit gathering device comprising a receptacle, a hopper shaped member flexibly connected to the receptacle and normally supported above it and discharging thereinto, a cushion flexibly supported within the hopper shaped member in spaced relation to the wall of the hopper shaped member, and a flexible chute flexibly attached to the hopper shaped member.

2. A fruit gathering device comprising a receptacle, a hopper shaped member flexibly connected to the receptacle and normally supported above it and discharging thereinto, a cushion flexibly supported within the hopper shaped member in spaced relation to the wall of the hopper shaped member, a flexible chute flexibly attached to the hopper shaped member, and a receiving hopper disposed in the mouth of the chute.

3. A fruit gathering device comprising a support, a receptacle open at its opposite ends, means for closing the lower end of the receptacle, a hopper shaped member supported within the upper end of the receptacle and flexibly connected thereto, flexible connections for engaging the hopper shaped member with the support, a tubular chute operatively connected with the hopper shaped member and discharging thereinto, a cushion disposed below the mouth of said chute, and a hopper shaped receiving member disposed in the open end of the chute.

4. A fruit gathering device comprising a support, a receptacle open at its opposite ends, means for closing the lower end of the receptacle, a hopper shaped member supported within the upper end of the receptacle and flexibly connected thereto, flexible connections for engaging the hopper shaped member with the support, a tubular chute operatively connected with the hopper shaped member and discharging thereinto, a cushion disposed below the mouth of said chute, a hopper shaped receiving member disposed in the open end of the chute, and means for adjusting the hopper shaped receiving member nearer to or farther from the receptacle.

5. A fruit gathering device comprising a support, a receptacle open at its upper and lower ends and having means whereby the lower end may be closed, a hopper shaped member of flexible material disposed in the upper end of the receptacle and flexibly connected thereto, and having operative connections to said support, a cushioning pad disposed within the lower end of the hopper shaped member and less in diameter than said member and flexibly connected thereto, a tubular chute of flexible material having its lower end flexibly connected to the upper end of said chute and having means whereby it may be supported.

6. A fruit gathering device comprising a support, a receptacle open at its upper and lower ends and having means whereby the lower end may be closed, a hopper shaped member of flexible material disposed in the upper end of the receptacle and flexibly connected thereto, and having operative connections to said support, a cushioning pad disposed within the lower end of the hopper shaped member and less in diameter than said member and flexibly connected thereto, a tubular chute of flexible material having its lower end flexibly connected to the upper end of said chute and having means whereby it may be supported, said tubular chute being provided at intervals with rings, and a hopper shaped receiving member having cords depending from it carrying hooks engageable with any set of said rings whereby to lengthen or shorten the tubular chute.

7. In a fruit gathering device, a receptacle, a flexible tubular chute operatively engaged therewith and discharging thereinto and having a series of sets of rings disposed at intervals along its length, a metallic tube disposed in the upper end of the chute, a hopper shaped member engaged with said tube, cords attached to said metallic tube and depending therefrom, and hooks on the ends of the cords adapted to be engaged with any set of rings, to thereby shorten or lengthen the effective length of a tubular chute.

In testimony whereof I hereunto affix my signature in the presence of two witnesses.

BENJAMIN FRANKLIN TUSSING.

Witnesses:
D. W. DUGGER,
S. L. TAYLOR.